UNITED STATES PATENT OFFICE 2,124,180

METAL RECOVERY PROCESS

Gustave E. Behr, New York, N. Y., assignor to National Lead Company, New York, N. Y., a corporation of New Jersey No Drawing. Application March 25, 1937, Serial No. 132,976

4 Claims. (Cl. 75—78)

The invention relates to caustic soda refining processes for the separation or removal of one or more of the components of metallic alloys, such as the separation of tin, antimony, etc. from lead alloys, and more particularly to the recovery of the values in the spent caustic in such processes, the principal object being economy which is realized in a substantial degree as will presently appear.

In caustic soda processes, the molten soda is removed from the kettle or other metal treating apparatus before it has become too thick for convenient handling. It is a mixture of caustic soda and the compounds of the reaction of the soda on the metal or metals in the melt which it was the purpose to remove. These are ordinarily oxysalts of tin, antimony and arsenic. When the process has been conducted for the removal of tin alone as distinguished from other alloy components, the principal reaction compound is sodium stannate. The mixture also contains a considerable amount of metallic prill taken up from the melt and held suspended in the mass.

The separate recovery of these materials, the soda for re-use in the process, the prill to be returned to the kettle and the other materials for further use or sale, has been accomplished heretofore by various methods, all requiring special apparatus and careful manipulation and all involved with more or less loss of soda, in consequence of which the refining process has often been found unduly expensive.

According to this invention, and as a first step, the spent caustic mixture is converted to the condition of a sludge and this sludge is treated with ordinary hydrated lime, calcium hydroxide. The caustic mixture can be easily made into a sludge by simply pouring it while molten into water, and the lime can be stirred into it in this condition. The sludge should be as thick as conveniently practical; enough water should be present at least to dissolve the free soda; more than such an amount is not economical, as it may have to be later removed. Preferably the liquid part of the sludge, i. e. the caustic liquor, should at least have a specific gravity of not much less than 1.05.

The reaction is the substitution by the calcium of the lime, $Ca(OH)_2$ for the sodium in the sodium reaction compounds or sodium stannate, the released sodium combining with the OH of the lime to form more caustic soda, $NaOH$. The reaction can be written as follows:

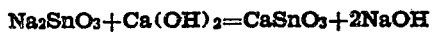

$$Na_2SnO_3 + Ca(OH)_2 = CaSnO_3 + 2NaOH$$

The sodium hydroxide thus produced obviously supplements that already present in the caustic liquor of the sludge. The calcium stannate is insoluble in the caustic liquor and in water, and therefore by simple washing and filtration can be separated easily and thoroughly from the sodium hydroxide. Contrary to expectation, I have found that by conducting the lime and sludge reaction in the cold, or at normal room temperature rather than hot, the exchange of sodium for calcium proceeds to practical completion, which it does not do at temperatures ordinarily conducive to chemical action, that is, at say 80° C., or above. In consequence of this fact, the lime treatment is not only economically conducted but the resulting filter cake when well washed contains substantially no sodium, free or combined, which means that practically all of the soda that was used in the kettle treatment is salvaged by the filtering for re-use.

Incidental to the foregoing but of special importance, the suspended prill separates itself from the calcium sludge automatically by sedimentation. The sodium sludge is slimy and of such a consistency that it is difficult to get prill out of it, special apparatus being required, whereas the calcium sludge of the same relative liquor content is relatively limpid and promptly lets the prill drop out of it for removal in a simple operation.

The filter cake can be sold for the calcium stannate value, or it can be smelted in any appropriate way, as with charcoal, sand and a flux, such as fluor spar, for the recovery of the metal therein which will be practically uncontaminated with any metal introduced by the prill. The resulting slag is free flowing and low melting and contains so small an amount of valuable metal, ordinarily less than a half per cent., that it is economical to throw it away.

It is pointed out that the improved economy of this process results from the treatment of the spent caustic in sludge form, which avoids the expense of solution and subsequent evaporation of the solvent, from the augmenting of the sludge liquor by the transfer thereto of the combined sodium of the sodium stannate, the completeness of such transfer at normal temperatures and the completeness of prill removal incident to the change of character of the sludge. All these factors combine to reduce costs.

When the alloy metals with which the molten caustic combines are other than tin, or present in addition to it, they will in general behave as tin does, exchanging sodium for calcium and will therefore appear in the filter cake and in the metal smelted therefrom, to be thereafter recovered and refined by ordinary means or as desired. Such sodium oxysalt in the spent caustic as is soluble in the liquor of the sludge will of course pass off with the latter. Ordinarily the amount will be small and will not interfere with the re-use of the soda for the treatment of more metallic alloy. It may be stated that except for its higher cost, caustic potash could be used in place of caustic soda, both being alkali metals equivalent here as generally elsewhere.

The following is claimed:

1. In the process of removing tin from lead alloys by treatment with molten caustic soda and wherein the spent caustic reagent contains sodium stannate with or without other oxysalts, the improvement which consists in forming a sludge of such spent reagent, reacting on such sludge with calcium hydroxite at room temperature, thereby converting substantially all of the sodium stannate to calcium stannate, and separating the resulting liquor from the solid matter.

2. In the process of removing tin from lead alloys by treatment with molten caustic soda and wherein the spent reagent contains sodium stannate with or without other oxysalts, the improvement which consists in mixing the spent caustic reagent with a quantity of water not substantially greater than required to dissolve the free soda and form a sludge, stirring lime into such sludge at room temperature in quantity sufficient to convert the sodium stannate into calcium stannate, allowing any prill to separate by sedimentation from the sludge and separating the liquor from the solids.

3. In the process of removing tin from lead alloys by treatment with molten caustic alkali and wherein the spent caustic reagent contains metallic prill in addition to an alkali stannate, the improvement which consists in mixing such spent reagent with water in quantity sufficient to form a sludge but insufficient to permit sedimentation of the prill in such sludge, stirring lime into such sludge in quantity sufficient to reduce the sludge consistency so as to produce sedimentation of said prill and also convert the alkali stannate to calcium stannate, and then separating the liquor from the suspended solids.

4. In the process of removing tin from lead alloys by treatment with molten caustic alkali, and wherein the spent caustic contains alkali stannate, the improvement which consists in mixing such spent caustic with no more water than will dissolve the free alkali and form a sludge of such consistency that any metallic prill originally held by the caustic will tend to remain in suspension, maintaining said sludge at normal temperature, substantially less than 80° C., then stirring lime into such sludge while at such temperature in quantity sufficient to convert all the alkali stannate to calcium stannate, and separating the resulting liquor from the solids.

GUSTAVE E. BEHR.